(12) United States Patent
Lange et al.

(10) Patent No.: US 8,825,443 B2
(45) Date of Patent: Sep. 2, 2014

(54) METHOD FOR CALCULATING CONSUMPTION AND/OR A REMAINING RANGE OF A MOTOR VEHICLE AND MOTOR VEHICLE

(75) Inventors: Rainer Lange, Ingolstadt (DE); Matthias Harries, Lauf (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/988,412

(22) PCT Filed: Nov. 14, 2011

(86) PCT No.: PCT/EP2011/005716
§ 371 (c)(1),
(2), (4) Date: Aug. 5, 2013

(87) PCT Pub. No.: WO2012/065708
PCT Pub. Date: May 24, 2012

(65) Prior Publication Data
US 2013/0325403 A1 Dec. 5, 2013

(30) Foreign Application Priority Data

Nov. 19, 2010 (DE) .......................... 10 2010 051 713
Nov. 19, 2010 (DE) .......................... 10 2010 051 714
Jun. 17, 2011 (DE) .......................... 10 2011 105 256

(51) Int. Cl.
*G06F 17/18* (2006.01)
*G01C 21/34* (2006.01)

(52) U.S. Cl.
CPC ............ *G01C 21/34* (2013.01); *G01C 21/3453* (2013.01); *G01C 21/3469* (2013.01)
USPC .............................................. 702/181; 702/158

(58) Field of Classification Search
USPC .......................................................... 702/181
See application file for complete search history.

(56) References Cited

U.S. PATENT DOCUMENTS

| 5,539,399 A | 7/1996 | Takahira et al. |
| 2007/0005235 A1* | 1/2007 | Suzuki et al. ................. 701/200 |

(Continued)

FOREIGN PATENT DOCUMENTS

| DE | 4344368 | 5/1995 |
| DE | 10302504 | 9/2004 |

(Continued)

OTHER PUBLICATIONS

High Gear Media Staff, 2011 Chevrolet Volt (Chevy) Review, Ratings, Specs, Prices, and Photos—The Car Conection, http://www.thecarconnection.com/overview/chevrolet_volt_2011, (Oct. 21, 2010).*

(Continued)

Primary Examiner — John Breene
Assistant Examiner — Timothy H Hwang
(74) Attorney, Agent, or Firm — Staas & Halsey LLP

(57) ABSTRACT

A method calculates a remaining range and/or consumption of a motor vehicle with an energy storage system for a drive which acts on at least one wheel of the motor vehicle. The remaining range and/or the consumption can be calculated in a first fashion by using a first algorithm and in a second fashion by using a second algorithm. The second fashion requires a higher degree of expenditure on calculation than the first fashion. Switching over between the first fashion and the second fashion occurs as a function of the energy stored in the energy storage system.

13 Claims, 2 Drawing Sheets

(56) References Cited

U.S. PATENT DOCUMENTS

| | | | | |
|---|---|---|---|---|
| 2010/0138093 A1* | 6/2010 | Oku et al. | | 701/22 |
| 2010/0185384 A1* | 7/2010 | Naito et al. | | 701/200 |
| 2010/0299057 A1* | 11/2010 | Osafune | | 701/200 |
| 2011/0032110 A1* | 2/2011 | Taguchi | | 340/636.1 |
| 2013/0006530 A1* | 1/2013 | Nishiuma et al. | | 701/533 |

FOREIGN PATENT DOCUMENTS

| | | |
|---|---|---|
| DE | 60308499 | 9/2007 |
| DE | 102007016108 | 10/2007 |
| DE | 102008037262 | 5/2009 |
| DE | 102009008327 | 8/2010 |
| DE | 102010051546.9 | 11/2010 |
| DE | 102010051713.5 | 11/2010 |
| DE | 102010051714.3 | 11/2010 |
| DE | 102011105256.2 | 6/2011 |
| EP | 2172740 | 4/2010 |
| EP | 2172740 A1 * | 4/2010 |
| WO | PCT/EP2011/005716 | 11/2011 |

OTHER PUBLICATIONS

Andreas Artmeier et al., "The Optimal Routing Problem in the Context of Battery-Powered Electric Vehicles," Technische Universität München, Department of Informatics, May 6, 2010, pp. 1-13.

English Language Translation of International Search Report for PCT/EP2011/005716, mailed Feb. 22, 2012, 2 pages.

WIPO English language translation of the International Preliminary Report on Patentability for PCT/EP2011/005716, 5 pages.

* cited by examiner

METHOD FOR CALCULATING CONSUMPTION AND/OR A REMAINING RANGE OF A MOTOR VEHICLE AND MOTOR VEHICLE

CROSS REFERENCE TO RELATED APPLICATIONS

This application is based on and hereby claims priority to International Application No. PCT/EP2011/005716 filed on Nov. 14, 2011 and German Application Nos. 10 2010 051 713.5 filed on Nov. 19, 2010, 10 2010 051 714.3 filed on Nov. 19, 2010 and 10 2011 105 256.2 filed on Jun. 17, 2011, the contents of which are hereby incorporated by reference.

BACKGROUND

The invention relates to a method for calculating a consumption and/or remaining range of a motor vehicle with an energy storage system for a drive which acts on at least one wheel of the motor vehicle, and to a motor vehicle.

Motor vehicles with energy storage systems for their drives have, on the one hand, a remaining range which is dependent on the energy currently stored in the energy storage system, and have, on the other hand, a consumption lever when they travel a certain distance. For this reason, methods have been proposed, in particular for motor vehicles with navigation systems, for determining the remaining range and/or the consumption of a motor vehicle and informing a driver thereof using the navigation system. For example, a range can be displayed in a superimposed fashion by an area of a map representation of a navigation system determined from the furthest points which can be reached. For example, areas which can still be reached with the currently stored energy, and which can be reached without return, can be characterized in one color, and further areas which can be reached with a return to the present location can be characterized in a different color (figurative representation of a "fried egg" shape in which "yellow—return" and "white=can be reached" would mean).

In order to determine the remaining range of a motor vehicle it has been proposed to use algorithms which are also used to determine routes to a destination to be traveled on in a navigation system. In this context, what is referred to as the Dijkstra algorithm or a derivative of the Dijkstra algorithm is mostly used. The Dijkstra algorithm is based on ultimately moving through the map data from one branching possibility to another starting from the starting position or current position, wherein an optimum path to a destination can be determined by a cost function, frequently the fastest travel-through time. Dijkstra algorithms, which ultimately feel their way through the map material, are also suitable for calculation of the remaining range if the cost function is based on the consumed energy for the route section as costs. However, during the determination of the remaining range there is no specific destination since it is necessary to advance in all directions, and the process is aborted if the energy consumed along the route corresponds to the energy currently stored in the energy storage system or exceeds the energy. This means that an enormous computing time and an expenditure on calculation which is very great are necessary to determine a remaining range or just points which can still be reached.

In addition, the Dijkstra algorithm is extremely inaccurate for calculating remaining ranges, at least in the case of relatively large ranges, since the actual consumption also depends on the driving style, the ambient conditions, the traffic and the like. The inaccuracy of the Dijkstra algorithm ultimately increases at least quadratically with the energy which is still present, with the result that a relatively high level of uncertainty has to be expected.

It has been proposed to take into account, within the scope of the Dijkstra algorithm, only relatively large roads, for example freeways and, if appropriate, also federal highways, but then the furthest points which can be reached which are then obtained are only points where this type of road is also present. Roads of a low category which lead away from these freeways and could potentially be reached are then possibly represented as unreachable in the display.

An alternative algorithm is proposed in patent application DE 10 2010 051 546.9-53 which was published after the priority date of the present document and in which, instead of the map data of the Dijkstra algorithm, it is proposed to base said algorithm on area segments which are each assigned energy costs, if appropriate as a function of direction, which costs are required to pass through the respective area segment. For example relatively large area segments of this kind can be selected, for example of a size of 2 km×2 km. Consequently, "running through" the area segments results in total in a consumption level which the motor vehicle has over the route which is run through. The calculation can be made here in a fashion analogous to the Dijkstra algorithm, wherein ultimately expansion occurs from a first area segment, in which the motor vehicle is, for example, situated at the current time, to a second area segment, which adjoins the first area segment and to which the lowest energy costs of all the area segments adjoining the first area segment are assigned. In the next step, expansion then occurs from the first and second area segment to a third area segment which adjoins the first area segment and to which the lowest energy costs after the second area segment of all the area segments adjoining the first area segment are assigned, or which adjoins the second area segment if in total lower energy costs are assigned to the first, second and third area segments than are assigned in total to the first area segment and that area segment to which the lowest energy costs after the second area segment of all the area segments adjoining the first area segment are assigned. This method is continued iteratively for the next area segments. Alternatively or additionally, the area segments can be expanded in a star shape and/or recursively for the calculation of consumption and/or ranges. The calculation of consumption and/or ranges on an expansion path can be aborted if the total of the energy costs of the area segments reaches or exceeds a predefined quantity of energy, in particular the quantity of energy currently stored in the energy storage system. This algorithm can be carried out with a significantly lower amount of expenditure on calculation than the Dijkstra algorithm based on the road network, with the result that a saving in terms of resources and time can be achieved. Although the algorithm is more heuristic than the Dijkstra algorithm, this is less relevant in particular in the case of large ranges since the influences which cannot be covered by the algorithm, and which have already been discussed above, give rise to a certain degree of inaccuracy in any case.

DE 10 2008 037 262 A1 discloses a method for outputting a determined remaining range of a refueling of a motor vehicle in a visual output of a navigation system of the motor vehicle. In this context, two possible ways of displaying the range are disclosed, specifically as a polygonal line or a circle. When the polygonal line is determined, inter alia roads and localities which can be traveled along or through by the vehicle are taken into account, wherein the range along a cross-country road is larger than when traveling through a town. The polygonal line can be displayed as a function of the filling level of the fuel tank. In this context, a sharpness of the polygonal line is selected as the fuel tank content decreases owing to more precise determination of the range.

EP 2 172 740 A1 relates to a map display device, wherein it is stated that it is difficult for a user to determine how long he has to charge a battery until a desired remaining range is achieved if he can only input a charging time in order to calculate this. As a solution it is proposed in said document that a range be determined for a plurality of charging times and that these ranges be displayed simultaneously. It is detected that in the case of a relatively large range a relatively large error occurs, with the result that a reduction in the determined range is to take place.

SUMMARY

One possible object therefore is specifying a calculation method for the remaining range and/or the consumption which, compared to the known algorithms, permits a balanced calculation in various situations.

The inventors propose a method for calculating a consumption and/or remaining range of a motor vehicle with an energy storage system for a drive which acts on at least one wheel of the motor vehicle. In the method, the remaining range and/or the consumption can be calculated in a first fashion by using a first algorithm and in a second fashion by using a second algorithm, wherein the second fashion requires a higher degree of expenditure on calculation that the first fashion, in that switching over between the first fashion and the second fashion occurs as a function of the energy stored in the energy storage system and in that an algorithm which is based on area segments with respectively assigned energy costs is used as the first algorithm, and a Dijkstra algorithm, which is based on road segments, or an algorithm which is derived from a Dijkstra algorithm and has energy values as a cost function is used as the second algorithm.

The inventors have therefore recognized that the use of a plurality of algorithms and of switching over nevertheless makes it possible to obtain sufficiently suitable values for the range and/or the consumption in any situation. As a result, accurate but computationally intensive algorithms and inaccurate algorithms which require less expenditure on calculation are known for the calculation of the remaining range. When there is a large amount of residual energy, that is to say for example in the case of a filled fuel tank and/or a fully charged battery, the remaining range may be, for example, 800 km or more for certain routes. Accurate calculation is not necessary here since the result here is in any case expected to be rather "rough" by the driver or user, in particular since influencing variables, such as, for example, the driving behavior, which cannot be represented by the algorithm, have a significantly greater influence than in the case of short remaining ranges or low residual energy levels. In contrast to this, in the case of short remaining ranges it is perfectly possible to carry out more accurate calculation, in particular by the second algorithm, since the expenditure owing to the low level of residual energy is less, and therefore a more accurate display can be obtained. Consequently, the method proposes that switching over takes place in the motor vehicle itself, for example by a calculation device which can be part of a navigation system, to specify which algorithm is then specifically used to determine the remaining range and/or consumption.

This makes it possible to achieve an overall reduction in the computing load in a calculation device, wherein it is perfectly conceivable that no appreciable decrease in quality occurs for the driver during the calculation of the remaining range.

An energy storage system which has a fuel tank and/or a battery can be used as the energy storage system. The method can therefore be used both for motor vehicles with just an internal combustion engine and pure electric motor vehicles as well as for hybrid vehicles.

In one refinement it is possible to provide that in the case of a limiting energy which undershoots a limiting value the second algorithm is used, and otherwise the first algorithm is used. This is appropriate, in particular, when the expenditure on calculation of the second algorithm drops with a short range and in addition the second algorithm is more accurate in the close range than the first algorithm. The effect according to which the expenditure on calculation drops can then be advantageously used in order nevertheless to make it possible to determine suitable and accurate values with the second algorithm exactly when they are required, for example if an algorithm which uses area segments would be too inaccurate owing to the size of the area segments, and the like.

In one specific embodiment it is provided that the first algorithm is an algorithm which is based on area segments with respectively assigned energy costs, and the second algorithm is a Dijkstra algorithm which is based on road segments and has energy values as a cost function. As already explained at the beginning, an algorithm which is based on area segments is described, for example, by DE 10 2010 051 546.9-53 which was published after the priority date of the present document. Such an algorithm ultimately has—depending on the size of the area segments—substantially the same degree of uncertainty over all the conceivable residual energy levels, but the uncertainty is, however, more conspicuous in the close range since the influence of external influencing variables such as, for example, the driving behavior or the ambient conditions, is lower here. For example, area segments of 1 km×1 km or greater can be considered here. In the case of the Dijkstra algorithm, not only does the inaccuracy increase as the distance increases, but also the expenditure on computation rises over-proportionally. However, in the close range, that is to say in the case of low remaining ranges or residual energy levels, the expenditure on computation remains within limits and more accurate calculation is possible. Correspondingly, a limiting value can then be selected in such a way that the expenditure on calculation does not become too large, and nevertheless sufficiently accurate information on the remaining range is always available.

In a further embodiment, a criterion which is used for switching over between the first fashion and the second fashion, in particular the limiting value, can be adapted as a function of a user input. It is therefore possible for a user himself to configure how quickly and/or how accurately the required information is to be made available to him. For example it is conceivable that a type of controller is provided by which a desired remaining range for switching over or the like can be set, on the basis of which range the criterion, in particular the limiting value, can then be advantageously adapted.

As already mentioned it is possible to provide that a partial area of a map which can be reached is determined from the results of the calculation of the remaining range and displayed. For example, it is possible, for the sake of clear differentiation, to display map areas which can still be reached in a different color from map areas which cannot be reached. The border of the partial area which can be reached can in this context also be smoothed in order to generate a more pleasant display image.

In addition to the method, the inventors also propose a motor vehicle having a calculation device for calculating a remaining range and/or consumption of the motor vehicle, a drive which acts on at least one wheel of the motor vehicle and an energy storage system for the drive, which is distinguished by the fact that the calculation device can calculate the remaining range and/or the consumption in a first fashion and a second fashion, wherein the second fashion requires a higher degree of expenditure on calculation than the first fashion, and the calculation device can switch over between the first fashion and the second fashion as a function of the energy stored in the energy storage system wherein the first algorithm is an algorithm which is based on area segments with respectively assigned energy costs, and the second algorithm is a Dijkstra algorithm which is based on road segments or an algorithm which is derived from a Dijkstra algorithm and has energy values. The calculation device is therefore ultimately designed to carry out the method, with the result that all the statements relating to the method can be transferred analogously to the motor vehicle with which the advantages can consequently also be achieved.

In particular it is possible to provide that the energy storage system has a fuel tank and/or a battery. The method can consequently be implemented in motor vehicles with just an internal combustion engine or in purely electric motor vehicles as well as in hybrid vehicles.

Furthermore it is possible to provide that the calculation device is part of a navigation system, in particular a control unit of a navigation system. Since some of the algorithms are also used to determine optimum routes it may be appropriate also to integrate the calculation of the remaining range and/or of the consumption as a function into the navigation system, with the result that hardware and/or software which are present under certain circumstances can be used multiply.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
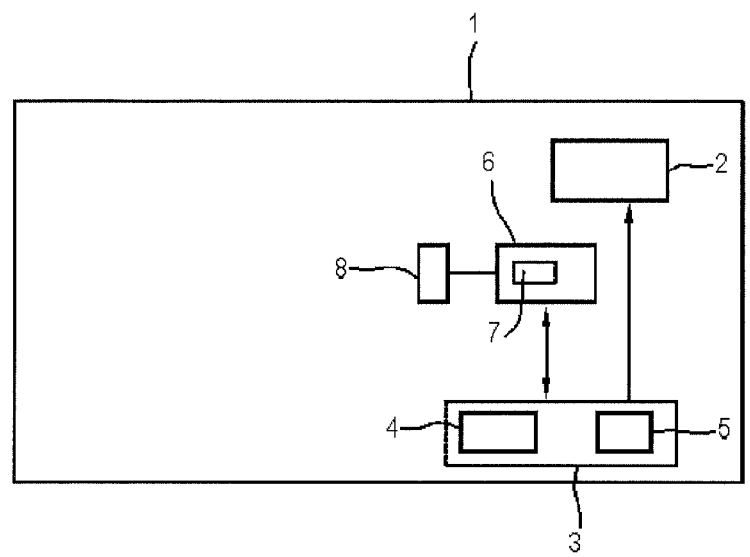
FIG. 1 shows a basic sketch of a proposed motor vehicle.

Reference will now be made in detail to the preferred embodiments of the present invention, examples of which are illustrated in the accompanying drawings, wherein like reference numerals refer to like elements throughout.

FIG. 1 shows a basic sketch of a proposed motor vehicle 1. It is a hybrid vehicle which means that the energy storage system 3 assigned to the drive 2 comprises both a fuel tank 4 and a battery 5. Data relating to the remaining energy which is currently present in the energy storage system 3 is passed on to a navigation system 6 which comprises a calculation device 7. The latter is designed to calculate the remaining range and/or the consumption in a first fashion by using a first algorithm and in a second fashion by using a second algorithm, wherein the second fashion requires a higher degree of expenditure on calculation than the first fashion. Depending on the energy stored in the energy storage system 3 it is possible to switch over between the first fashion and the second fashion, wherein here an energy limiting value is used as a criterion. The calculation device 7 is therefore designed to carry out the method.

The navigation system 6 is also connected to a display device 8 on which a calculated remaining range and/or a calculated consumption level can be displayed.

Figure 2:
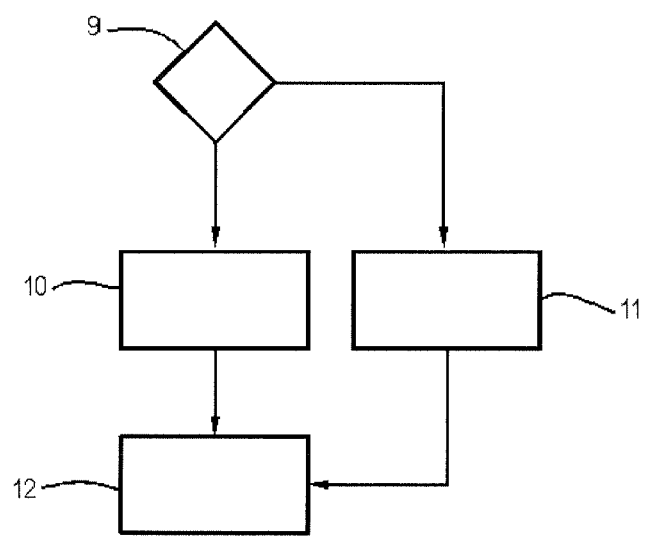
FIG. 2 shows a flowchart of the proposed method.

FIG. 2 shows a possible flowchart of an exemplary embodiment of the proposed method. In step 9 it is checked whether the residual energy stored in the energy storage system 3 undershoots a limiting value. If this is not the case, in a step 10 for determining the remaining range the first algorithm is used, which means that the remaining range is calculated in the first fashion. In this context, an algorithm is used here which is based on division of the map into area segments which are respectively assigned energy costs in order to pass through the area segment. Starting from the area segment in which the motor vehicle 1 is currently located, end area segments which can be reached by the remaining residual energy are then searched.

If it is detected in step 9 that the energy stored in the energy storage system 3 is less than the limiting value, in step 11 the remaining range is calculated in the second fashion by the second algorithm, which involves here a Dijkstra algorithm which is widely known and in which the cost function is considered as costs by reference to energy values. In this context, the current position of the motor vehicle 1 or a road section which the motor vehicle 1 is currently driving on is taken as a starting point in order to find destinations on the map which are the furthest which can be reached with the remaining residual energy.

Figure 3:
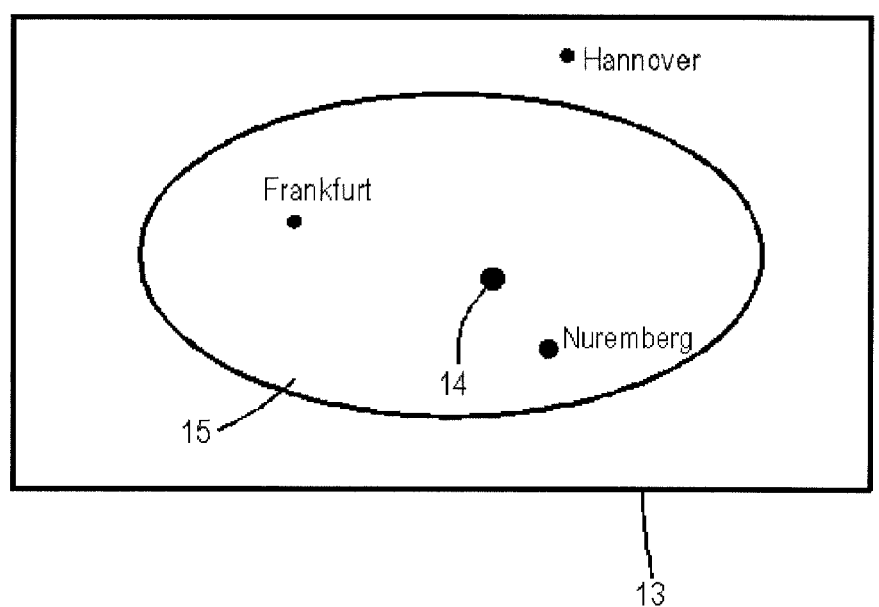
FIG. 3 shows a basic sketch of a possible display of a remaining range.

Both in order to terminate the first fashion and to terminate the second fashion, an area is then calculated which describes the range area such as it is described by the area segments or destinations, wherein, for example, an edge can be determined as a polygonal line or the like. In step 12, the partial area of the map which is determined in this way is displayed on the display device 8. Such a possible display is illustrated as a basic sketch in FIG. 3.

The current position 14 is displayed on the map 13 next to the customary map information, for example the position of towns. Areas located within the partial area 15 are in this context displayed in a different color to areas located outside the partial area 15, which areas can, for example, be represented in red. Of course, other colors or color combinations are also conceivable.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method for calculating a remaining range and/or a consumption of a motor vehicle with an energy storage system for a drive which acts on at least one wheel of the motor vehicle, comprising:
    calculating, using a calculation device, the remaining range and/or the consumption by using a first algorithm;
    calculating, using the calculation device, the remaining range and/or the consumption by using a second algorithm, the calculation by the calculation device of the remaining range and/or the consumption using the second algorithm requiring a higher computing load on the calculation device than the calculation by the calculation device of the remaining range and/or the consumption using the first algorithm, switching over between using the first algorithm and using the second algorithm as a function of energy stored in the energy storage system, wherein the first algorithm is an algorithm which is based on area segments with respectively assigned energy costs, and the second algorithm is a Dijkstra algorithm, which is based on road segments, or an algorithm which is derived from the Dijkstra algorithm, the second algorithm having energy values as a cost function.

2. The method as claimed in claim 1, wherein the energy storage system comprises a fuel tank and/or a battery.

3. The method as claimed in claim 1, wherein if the energy stored in the energy storage system is less than a limiting value, the second algorithm is used, and otherwise the first algorithm is used.

4. The method as claimed in claim 3, wherein the limiting value is adapted as a function of a user input.

5. The method as claimed in claim 1, wherein for switching over between the first algorithm and the second algorithm, a limiting value for energy stored in the energy storage system, is used, and the limiting value is adapted as a function of a user input.

6. The method as claimed in claim 1, wherein in a map a partial area which can be reached is determined from the remaining range of the motor vehicle, and the partial area is displayed.

7. A motor vehicle comprising:

a calculation device to calculate a remaining range and/or consumption of the motor vehicle;

a drive which acts on at least one wheel of the motor vehicle; and an energy storage system for the drive, wherein the calculation device comprises:

a first calculation unit to calculate the remaining range and/or the consumption using a first algorithm which is based on area segments with respectively assigned energy costs;

a second calculation unit to calculate the remaining range and/or the consumption using a second algorithm, the calculation by the second calculation unit of the remaining range and/or the consumption using the second algorithm requiring a higher computing load on the second calculation unit than a computing load on the first calculation unit for the calculation of the remaining range and/or the consumption using the first algorithm, the second algorithm corresponding to a Dijkstra algorithm based on road segments or an algorithm which is derived from the Dijkstra algorithm, the second algorithm using energy values as a cost function; and a switching unit to switch over between using the first algorithm and using the second algorithm as a function of energy stored in the energy storage system.

8. The motor vehicle as claimed in claim 7, wherein the energy storage system comprises a fuel tank and/or a battery.

9. The motor vehicle as claimed in claim 7, wherein the calculation device is part of a navigation system.

10. The motor vehicle as claimed in claim 7, wherein if the energy stored in the energy storage system is less than a limiting value, the second algorithm is used, and otherwise the first algorithm is used.

11. The motor vehicle as claimed in claim 10, wherein the limiting value is adapted as a function of a user input.

12. The motor vehicle as claimed in claim 7, wherein for switching over between the first algorithm and the second algorithm by the switching unit, a limiting value for energy stored in the energy storage system is used, and the limiting value is adapted as a function of a user input.

13. The motor vehicle as claimed in claim 7, further comprising a display device to display the calculated remaining range and/or calculated consumption, wherein the display device further displays a map including a partial area which corresponds to destinations on the map which can be reached based on the energy stored in the energy storage system, the partial area being determined from the remaining range of the motor vehicle calculated using one of the first algorithm or second algorithm.

* * * * *